(12) United States Patent
Hsu et al.

(10) Patent No.: US 11,381,169 B2
(45) Date of Patent: Jul. 5, 2022

(54) POWER SUPPLY UNIT WITH AUXILIARY BOOST CONTROL IN BOOTLOADER MODE

(71) Applicant: Astec International Limited, Kowloon (HK)

(72) Inventors: Chih-hao Hsu, Taipei (TW); Chang-Chieh Yu, Taipei (TW); Carl Walker, Taipei (TW); Chun-Wei Chang, Taipei (TW); Po-Tso Chen, Taipei (TW)

(73) Assignee: Astec International Limited, Kowloon (HK)

( * ) Notice: Subject to any disclaimer, the term of this patent is extended or adjusted under 35 U.S.C. 154(b) by 0 days.

(21) Appl. No.: 17/034,044

(22) Filed: Sep. 28, 2020

(65) Prior Publication Data

US 2022/0103071 A1    Mar. 31, 2022

(51) Int. Cl.
*H02M 1/36* (2007.01)
*H02M 3/158* (2006.01)
*H02M 1/32* (2007.01)
*H02M 1/44* (2007.01)
*G06F 1/28* (2006.01)
*H02M 1/00* (2006.01)

(52) U.S. Cl.
CPC ............ *H02M 3/1582* (2013.01); *G06F 1/28* (2013.01); *H02M 1/0032* (2021.05); *H02M 1/32* (2013.01); *H02M 1/36* (2013.01); *H02M 1/44* (2013.01)

(58) Field of Classification Search
CPC ........ H02M 1/32; H02M 1/44; H02M 3/1582; H02M 1/0006; H02M 1/36; G06F 1/28
See application file for complete search history.

(56) References Cited

U.S. PATENT DOCUMENTS

| 8,222,772 | B1 | 7/2012 | Vinciarelli | |
|---|---|---|---|---|
| 9,780,674 | B2 | 10/2017 | Freeman et al. | |
| 10,595,383 | B1* | 3/2020 | Mays, II | G06F 8/61 |
| 10,725,519 | B1* | 7/2020 | Misra | G06F 1/28 |
| 2006/0136154 | A1* | 6/2006 | Bliley | G06F 1/28 |
| | | | | 702/58 |
| 2011/0078435 | A1* | 3/2011 | Krieger | G06F 1/26 |
| | | | | 713/100 |

(Continued)

FOREIGN PATENT DOCUMENTS

| CN | 107765585 A | 3/2018 |
|---|---|---|
| WO | 2010126477 A1 | 11/2010 |
| WO | 2017123220 A1 | 7/2017 |

OTHER PUBLICATIONS

Extended European Search Report for EP Application No. 21199031.2, dated Feb. 11, 2022; 25 pages.

*Primary Examiner* — Kyle J Moody
*Assistant Examiner* — Jye-June Lee

(57) ABSTRACT

The technology described herein is directed to a DC input power supply unit with an auxiliary boost control circuit (or controller) that facilitates continuous supply of power to a standby output load of the power supply unit in a bootloader mode. More specifically, the auxiliary boost circuit (or controller) is configured to assume control of a primary power boost stage from a primary controller in a bootloader mode so that the power supply unit can continue to supply power to the standby output with a protection function regardless of the state of the power supply unit or primary controller.

20 Claims, 10 Drawing Sheets

(56) References Cited

U.S. PATENT DOCUMENTS

| 2012/0026759 | A1 | | 2/2012 | Balakrishnan et al. |
| 2012/0124568 | A1 | * | 5/2012 | Fallon ..................... G06F 9/453 |
| | | | | 717/169 |
| 2019/0216293 | A1 | * | 7/2019 | Yoda ......................... G06F 1/26 |

* cited by examiner

POWER SUPPLY UNIT WITH AUXILIARY BOOST CONTROL IN BOOTLOADER MODE

TECHNICAL FIELD

Aspects of the disclosure are related to the field of power supply units, and in particular, to a direct current (DC) input switched-mode power supply unit with auxiliary boost control to facilitate continuous supply of power to a standby output load during a bootloader mode.

BACKGROUND

A switched-mode power supply (or switching power converter) is an electronic power supply that incorporates a switching regulator to efficiently convert electrical power. Like other power supplies, a switched-mode power supply transfers power from a direct current (DC) or alternating current (AC) source to DC loads such as, for example, a personal computer, a server computer, a cloud computing platform, data center equipment, etc., while converting voltage and current characteristics. Unlike linear power supplies, the pass transistor of a switched-mode power supply continually switches between low-dissipation, full-on and full-off states, to minimize wasted energy. The voltage regulation is achieved by varying the ratio of on-to-off time (also referred to as the duty cycle).

A switched-mode power supply may be utilized to supply power to a load over a wide range. That is, relatively large amounts of power may be required by a load in a "normal" operating mode, whereas relatively little power may be required by the load during a "standby" operating mode. For example, an LCD flat-panel television receiver may require 350 Watts of operating power during normal operation but may only draw a nominal amount of power (e.g., 1 or 2 Watts) in a standby mode (i.e., when the LCD flat-panel television is "turned off" in order to keep remote control circuitry active, etc.).

Switched-mode power supplies are often regulated using one or more controllers, e.g., microcontrollers, to, for example, maintain a constant output voltage. Indeed, switched-mode power supplies often employ digital controllers that monitor current drawn by the load and increase or decrease the switching duty cycle as power output requirements change. Digital control is more popular than analog control as there are many advantages such as, for example, flexibility, ease of control redesign and integration, reduction in the number and cost of components, etc. While digital control redesign is possible, a bootloader is required to implement the redesign. A bootloader (or bootloader procedure) is a piece of code that allows user application code to be updated through a communication interface such as, for example, an I2C, a UART, etc.

Unfortunately, today's switched-mode power supplies often do not support continuous supply of power to a standby output load during bootloader mode as there is no regulation for a boost stage during bootloader mode and the power supply often does not function well with low input voltages. Accordingly, bootloader procedures are prone to fail or otherwise cause disruptions to output loads.

SUMMARY

One or more embodiments described herein, among other benefits, solve one or more of the foregoing or other problems in the art by providing systems, methods, and non-transitory computer readable media for continuously supplying power to a standby output of a microcontroller-based switched-mode power supply unit while in a bootloader mode.

In some implementations, the technology described includes a power supply unit including an input configured to receive a DC input voltage from a voltage source, a main output configured to supply a predetermined DC output voltage to a load, and a standby output configured to supply a nominal DC output voltage to the load. The power supply unit further includes a filter, a boost stage circuit, a primary controller, a boost auxiliary circuit, a buck stage circuit, a secondary controller, and a bias module. The filter is coupled to the input and configured to reduce electromagnetic interference (EMI) in the input voltage. The boost stage circuit is coupled with the filter and configured to regulate step up of an output of the filter to a minimum threshold voltage based on a boost regulator signal. The primary controller is coupled with the boost stage circuit and configured to control the boost regulator signal. The boost auxiliary circuit is coupled with the primary controller and configured to assume control of the boost regulator signal during the bootloader mode. The buck stage circuit is coupled with the boost stage circuit and configured to regulate step down of an output voltage of the boost stage circuit to a predetermined DC output voltage based on a buck regulator signal. The secondary controller is coupled with the buck stage circuit and configured to control the buck regulator signal. The bias module is coupled with the boost stage circuit and configured to regulate the output voltage of the boost stage circuit to a nominal DC output voltage.

In some implementations, the technology described includes a method of continuously supplying power to a standby output of a power supply unit in a bootloader mode. The method includes receiving, by an input port of the power supply unit, a direct current (DC) input voltage from a voltage source, filtering, by an electromagnetic interference (EMI) filter, the input voltage, and driving, by a primary controller of the power supply, the boost regulator signal to control regulation by a boost stage circuit. The method further includes regulating, by the boost stage circuit, step up of the filtered input voltage to a minimum threshold voltage based on the boost regulator signal, asserting, by the primary controller, a bootloader signal in response to receiving a request to enter the bootloader mode, and responsive to detecting assertion of the bootloader signal, assuming, by a boost auxiliary circuit coupled with the primary controller, control of driving the boost regulator signal to continuously supply the power to the standby output of the power supply unit in the bootloader mode.

In some implementations, the technology described includes an auxiliary boost control circuit for a low voltage direct current (LVDC) input power supply unit. The auxiliary boost control circuit includes means for monitoring for assertion of a bootloader signal in an idle state, wherein the bootloader signal indicates that a primary controller of the power supply unit is entering a bootloader mode. The auxiliary boost control circuit further includes means for transitioning the auxiliary boost control circuit from the idle state to an auxiliary protection state responsive to assertion of the bootloader signal, wherein the auxiliary boost control circuit is configured to assume control of a boost regulator signal for controlling regulation of a boost stage circuit for stepping up an input to a minimum threshold voltage.

Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not considered to be limiting of its scope. Implementations will be described and explained with additional specificity and detail through the use of the accompanying drawings.

Figure 1:
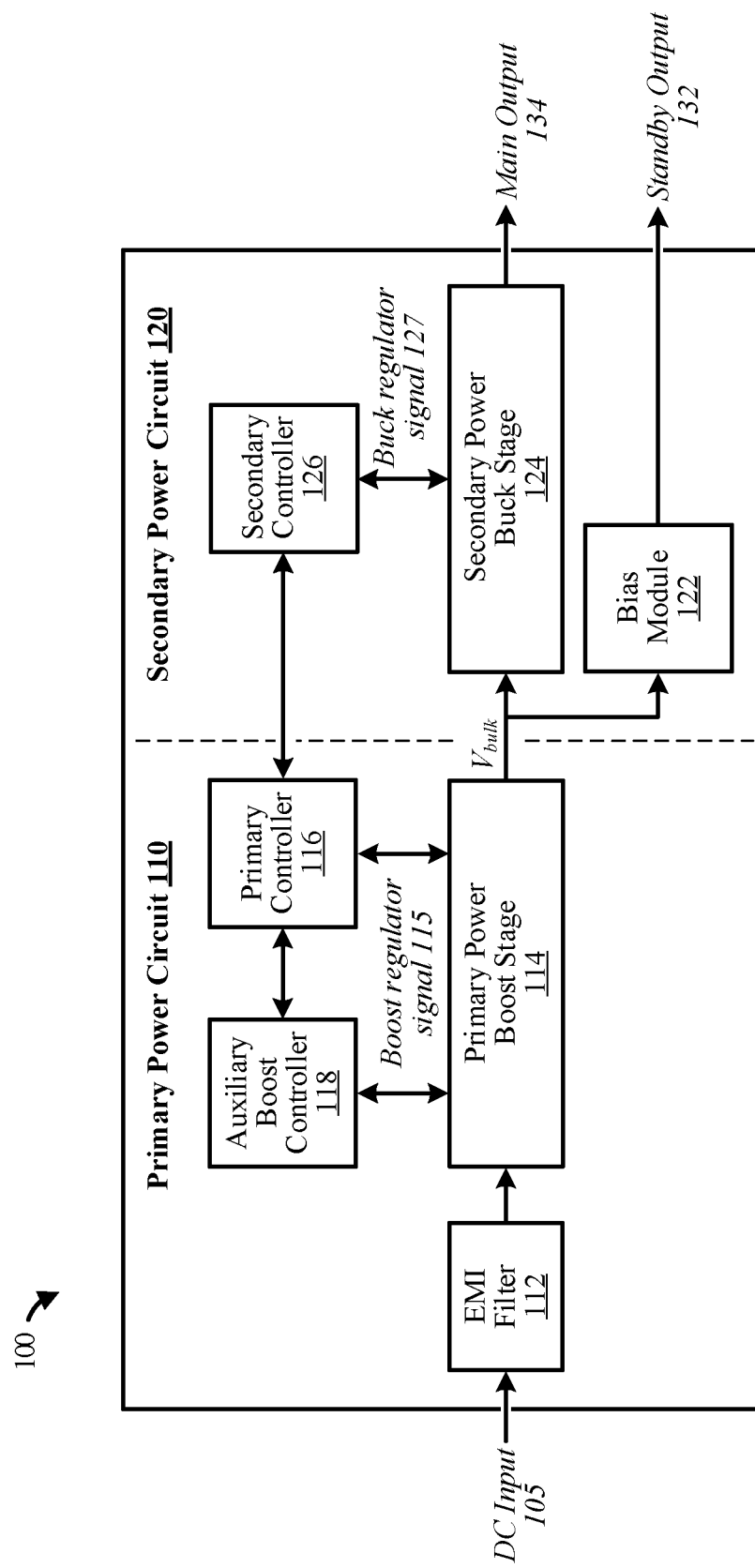
FIG. 1 depicts a block diagram illustrating an example power supply unit that includes an auxiliary boost controller for assuming control of a primary power boost stage during a bootloader mode, according to some implementations.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Example implementations are provided so that this disclosure will be thorough, and will fully convey the scope to persons skilled in the art. Numerous specific details are set forth such as examples of specific components, devices, and methods, to provide a thorough understanding of implementations of the present disclosure. It will be apparent to those skilled in the art that specific details need not be employed, that example implementations may be embodied in many different forms and that neither should be construed to limit the scope of the disclosure. In some example implementations, well-known processes, well-known device structures, and well-known technologies are not described in detail.

The terminology used herein is for the purpose of describing particular example implementations only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As noted above, switched-mode power supplies are often regulated using one or more digital controllers, e.g., microcontrollers, to, for example, maintain a constant output voltage. Furthermore, it is necessary to implement a bootloader procedure in order to effectuate any redesign of the digital control. Unfortunately, today's switched-mode power supplies often do not support continuous supply of power to a standby output load during bootloader mode as there is no regulation for a boost stage during bootloader mode and the power supply often does not function well with low input voltages. Accordingly, bootloader procedures are prone to fail or otherwise cause disruptions to output loads.

The technology described herein is directed to a DC input power supply unit with an auxiliary boost control circuit (or controller) that facilitates continuous supply of power to a standby output load of the power supply unit in a bootloader mode. More specifically, the auxiliary boost circuit (or controller) is configured to assume control of a primary power boost stage from a primary controller in a bootloader mode so that the power supply unit can continue to supply power to the standby output with a protection function regardless of the state of the power supply unit or primary controller.

FIG. 1 depicts a block diagram illustrating an example power supply unit 100 that includes an auxiliary boost controller 118 for assuming control of a primary power boost stage 114 during a bootloader mode, according to some implementations. More specifically, the auxiliary boost controller 118 is configured to assume control of the primary power boost stage 114 to support supplying a standby output 124 to a load (not shown) when the primary controller 116 is in a bootloader mode. As shown in the example of FIG. 1, the power supply unit 100 is a low voltage DC input switched-mode power supply (SMPS). However, it is appreciated that the power supply unit 100 can be any power supply that continuously supports a standby output to a load in bootloader mode.

As shown in the example of FIG. 1, the power supply unit 100 comprises a boost-buck converter in a two-stage cascaded topology (boost into buck). More specifically, the initial boost stage either allows the passing of voltage inputs greater than a minimum threshold voltage or utilizes its boost capabilities to increase input voltages to the minimum threshold voltage. The buck stage then takes the heightened (or stepped up) voltage levels from the initial boost stage and converts them to a steady predetermined output voltage.

The power supply unit 100 includes a primary power circuit 110 and a secondary power circuit 120. The primary power circuit 110 includes a DC input 105, an electromagnetic interference (EMI) filter 112, a primary power boost stage 114, a primary controller 116, and an auxiliary boost controller 118. The secondary power circuit 110 includes a bias module 122, a secondary power buck stage 124, and a secondary controller 126. Other components, modules or controllers are also possible.

In operation, the power supply unit 100 receives and feeds a DC input 105 to the EMI filter 112. The EMI filter 112 is configured filter DC input 105 to acceptable predetermined levels. The problem with EMI is that it can induce to malfunction of electronic equipment, false activation of protection devices or inaccurate operation of radar and telecommunication equipment if the amount of radiated EMI does not comply with electromagnetic compatibility standards. Accordingly, adequate filtering is necessary to guarantee quality of the power supply unit 100. Switch-mode power supplies, inverters and in general all power electronics are sources of EMI. Indeed, EMI is generated by most electrical and electronic equipment when switching of the current takes place. In some implementations, the EMI can take the form of conducted EMI, noise that travels through electrical conductors, wires and components. The EMI can also manifest as radiated EMI which is noise that travels through the air as magnetic fields or radio waves. The output of the EMI filter 112 is fed to the primary power boost stage 114.

The primary power boost stage 114 steps up (or increases) the output of the EMI filter 112 to the minimum threshold voltage. As shown in the example of FIG. 1, the step up (or increase) is regulated by boost control signaling 115 provided by the primary controller 116 during a "normal" (or non-bootloader) operating mode and by the auxiliary boost controller 118 during a bootloader mode. As discussed herein, a bootloader is a piece of code which allows user application code to be updated through a communication interface such as, for example, I2C, UART, etc. The power supply unit 100 is said to be in the bootloader mode when the primary controller 116 is performing bootloader operations. Thus, the boost control signaling 115 is driven by the primary controller 116 during the "normal" (or non-bootloader) operating mode and by the auxiliary boost controller 118 during the bootloader mode.

The primary controller 116 can be a microcontroller or any digital circuitry configured to monitor the output $V_{bulk}$ of the primary power boost stage 114 and, in turn, regulate the primary power boost stage 114 via the boost control signaling 115 during the "normal" (or non-bootloader) operating mode. The primary controller 116 provides digital control over the primary power boost stage 114 during the "normal" (or non-bootloader) operating mode. As discussed herein, compared to analog control, there are numerous advantages to digital control including, but not limited to, flexibility, ease of control redesign, ease of integration, components reduction, reduced component costs, etc. However, it is necessary to implement a bootloader procedure when the digital control is redesigned and primary controller 116 cannot regulate the primary power boost stage 114 when implementing the bootloader procedure, i.e., during the bootloader mode. During bootloader mode, the primary controller 116 asserts a bootloader signal (not shown) to indicate that the primary controller 116 is in the bootloader mode. An example illustrating operation of the primary controller 116 entering and then exiting bootloader mode is shown and discussed in greater detail with reference to FIG. 3. Furthermore, an example primary controller 200 is shown and discussed in greater detail with reference to FIG. 2.

The auxiliary boost controller 118 can be a microcontroller or a digital or analog circuit configured to assume control of regulating the primary power boost stage 114 via the boost control signaling 115 during bootloader mode in order to continuously supply power to the standby output 132. Although not shown in the example of FIG. 1, in some implementations, the primary controller 116 and the auxiliary boost controller 118 each drive boost control signaling. In such instances, the boost control signaling can be tied together and fed to the primary power boost stage 114.

In some implementations, the primary power boost stage 114 can be a DC-to-DC boost power converter (or step-up power converter) that steps up voltage (while stepping down current) from its input (supply) to its output (load). Although not illustrated in the example of FIG. 1, the primary power boost stage 114 can be a class of switched-mode power supply (SMPS) containing at least two semiconductors (a diode and a transistor) and at least one energy storage element: a capacitor, inductor, or the two in combination. Furthermore, to reduce voltage ripple, filters made of capacitors (sometimes in combination with inductors) can be included to such a converter's output (load-side filter) and input (supply-side filter). The output $V_{bulk}$ of the primary power boost stage 114 is fed to the secondary power circuit 120.

The secondary power buck stage 124 steps down (or decreases) the output $V_{bulk}$ of the primary power boost stage 114 to regulate or otherwise maintain the main output 134 to a load (not shown) as constant. As shown in the example of FIG. 1, the step down (or decrease) is regulated by buck control signaling 127 provided by the secondary controller 126. The secondary controller 126 can be a microcontroller or any digital circuitry configured to monitor the main output 134 of the secondary power buck stage 124 and, in turn, regulate the secondary power buck stage 124 via the buck control signaling 127 during the "normal" (or non-bootloader) operating mode.

In some implementations, the secondary power buck stage 124 can be a DC-to-DC power converter (or step-down converter) that steps down voltage (while stepping up current) from its input (supply) to its output (load). Although not illustrated in the example of FIG. 1, the secondary power buck stage 114 can be a class of SMPS containing at least two semiconductors (a diode and a transistor) and at least one energy storage element, a capacitor, inductor, or the two in combination. However, many modern buck converters replace the diode with a second transistor for synchronous rectification. To reduce voltage ripple, filters made of capacitors (sometimes in combination with inductors) can be included to such a converter's output (load-side filter) and input (supply-side filter).

The bias module 122 also receives the output $V_{bulk}$ of the primary power boost stage 114 and generates a standby output 132. The power supply unit 100 can be utilized to supply power to a load over a wide range. For example, relatively large amounts of power may be provided to a load via the main output 134 in the "normal" operating mode, whereas relatively very little power may be provided to the load via the standby output 132 in the "standby" operating mode. As discussed above, existing switched-mode power supplies cannot support standby output load in bootloader mode as there is no regulation for the primary power boost stage 114 during bootloader mode and the bias module cannot work well in low input voltage either. Advantageously, the auxiliary boost controller 118 enables the power supply unit 100 to continuously drive (or otherwise support) the standby output 132 during the bootloader mode.

Figure 2:
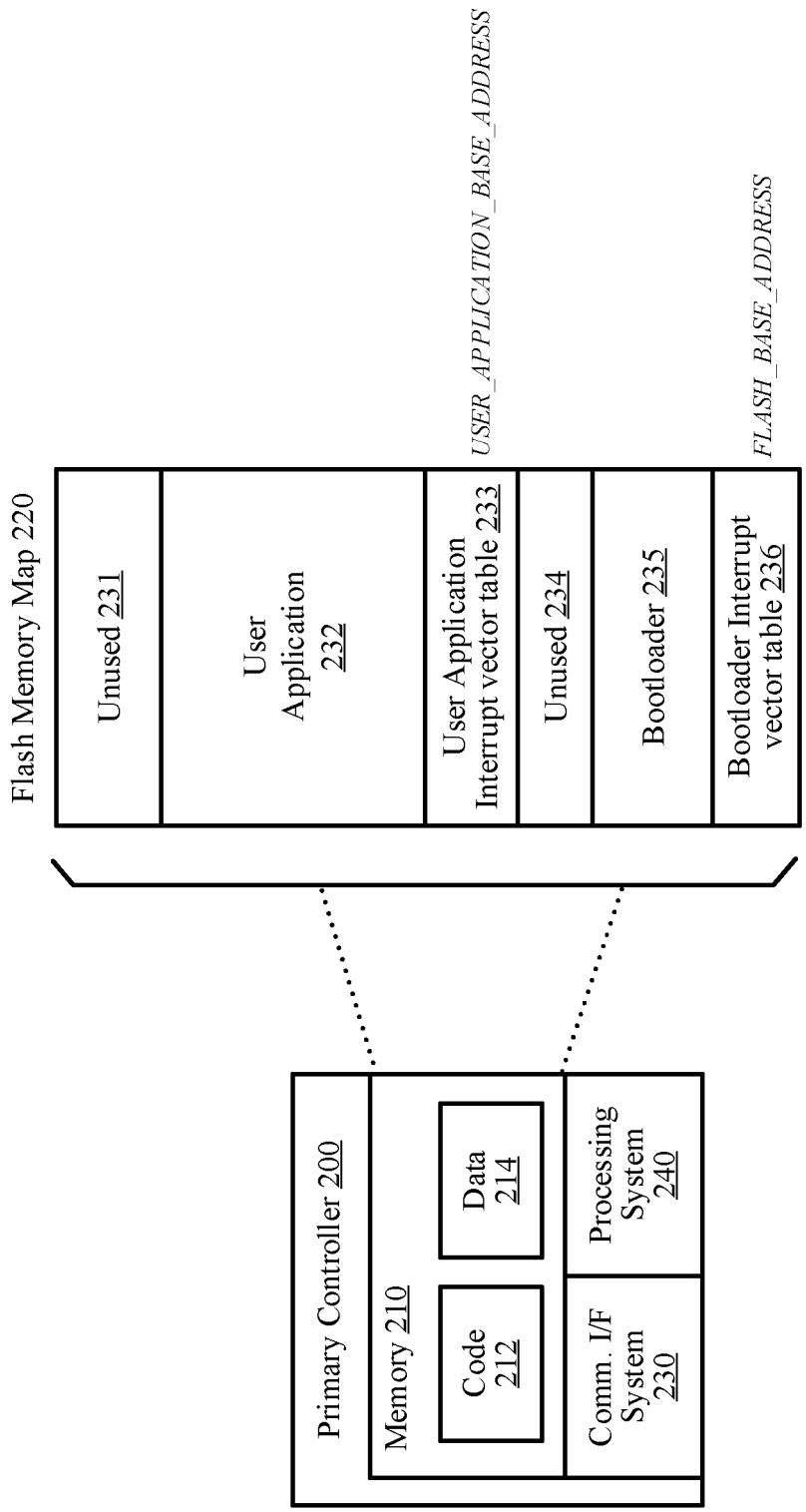
FIG. 2 depicts a block diagram illustrating example components of a primary controller in the form of a microcontroller, according to some implementations.

FIG. 2 depicts a block diagram illustrating example components of a primary controller 200 in the form of a microcontroller, according to some implementations. More specifically, the example of FIG. 2 depicts a primary controller 200 including a detailed view of a flash memory map 220 stored in memory 210, according to some implementations. The primary controller 200 can be primary controller 116 of FIG. 1, although alternative configurations are possible. As illustrated in the example of FIG. 2, the example components include memory 210, a communication interface 230, and a processing system 240. Additional or fewer components are possible.

In some implementations, the primary controller 200 can be a microcontroller or other circuitry that retrieves and executes software from memory 210. The primary controller 200 may be implemented within a single device or chip. As discussed with reference to FIG. 1, the primary controller 200 is operatively or communicatively coupled with various components including an auxiliary boost controller, a primary power boost stage, and a secondary controller.

As shown in the example of FIG. 2, the memory 210 can include program memory (or code 212) and data memory (data 214). Primary controller 200 functions discussed herein, and other circuitry and algorithms associated with the primary controller 200 can be implemented as software algorithms and may be stored as software code (e.g., in code memory 212). Similarly, real-time data and values of pre-defined constants may be stored in one or more forms of data memory (e.g., data memory 214). Although not shown, memory 210 includes a flash or Non-Volatile Memory (NVM). For example, the flash memory can be used to hold firmware code for the microcontroller. In such instances, on power up, a bootloader reads the contents of the flash memory and writes it to an internal SRAM. After the firmware code is written to SRAM, the primary controller 200 starts running from SRAM. The example of FIG. 2, the flash memory map 220 illustrates a memory allocation with a bootloader function. More specifically, the flash memory map 220 illustrates various sections of the flash memory including an unused section 131, a user application section 232, a user application interrupt vector table section 233, another unused section 234, a bootloader section 235, and a bootloader interrupt vector table 236.

The communication interface 230 may include communication connections and devices that together facilitate communication with other communication devices. The communication interface 230 can be any communication interface through which user application code can be updated such as, for example, an I2C, a UART, etc. The processing system 240 can include one or more processor cores that are configured to retrieve and execute the instructions for regulating the primary power boost stage 114 as discussed herein.

Figure 3:
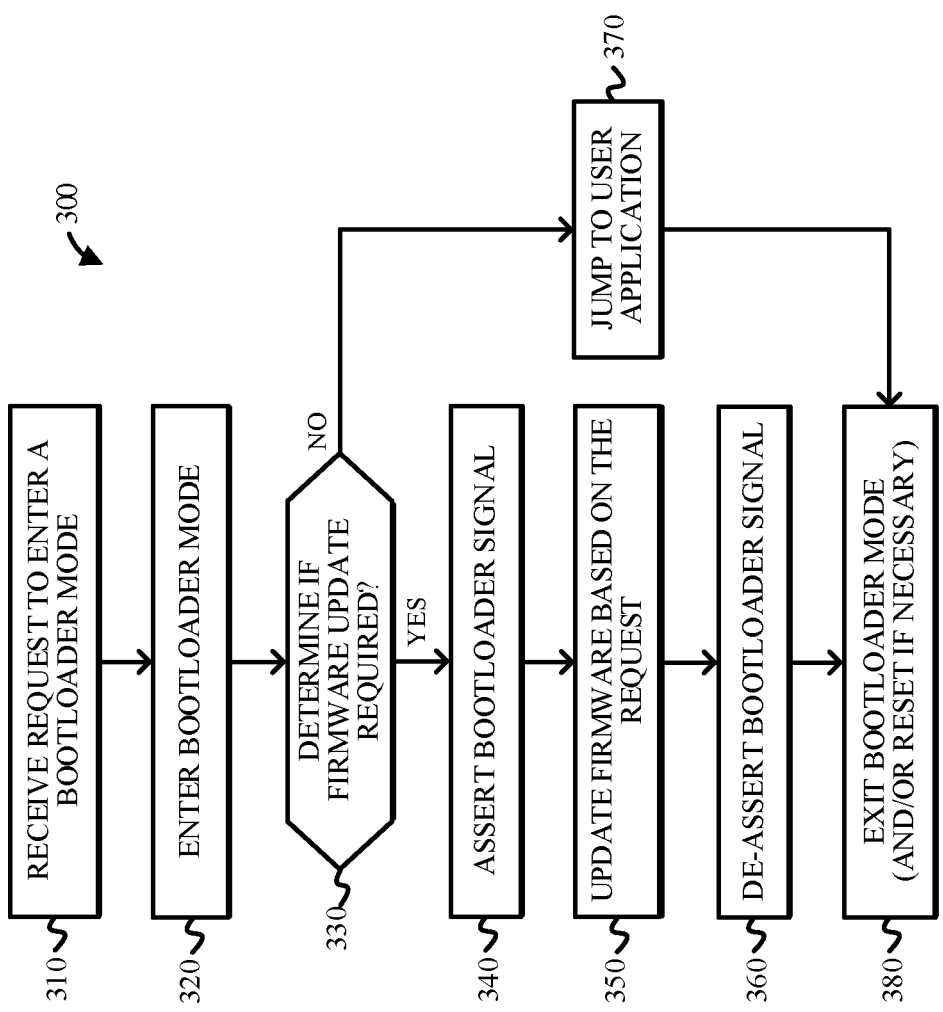
FIG. 3 depicts a flow diagram illustrating an example process for entering and exiting a bootloader mode, according to some implementations.

FIG. 3 depicts a flow diagram illustrating an example process 300 for entering and exiting a bootloader mode, according to some implementations. The example microcontroller process 300 may be performed in various implementations by a primary controller (or microprocessor) such as, for example, the primary controller 116 of FIG. 1 the primary controller of FIG. 2, or one or more processors, modules, engines, or components associated therewith.

To begin, at 310, the primary controller receives a request to enter a bootloader mode. The request to enter the bootloader mode can be initiated by an external system and received by a communication interface such as, for example, an I2C interface, a UART interface, etc. As discussed herein, the request to enter the bootloader mode includes a request to update user application code. At 320, the primary controller enters the bootloader mode.

At decision 330, the primary controller determines if a firmware update is required. If a firmware update is required, at 340, the primary controller asserts the bootloader signal. As discussed herein, assertion of the bootloader signal can be driving the bootloader signal low. An example is shown and discussed with reference to FIG. 8 and FIGS. 9A and 9B. However, if a firmware update is not required, at 370, the primary controller jumps to the user application in flash memory, e.g., see USER_APPLICATION_BASE_ADDRESS in the user application interrupt vector table of flash memory of FIG. 2.

At 350, the primary controller updates firmware based on the request. At 360, the primary controller de-asserts the bootloader signal. As noted above, de-assertion of the bootloader signal can be driving (or re-driving) the bootloader signal high. Lastly, at 380, the primary controller exits bootloader mode and resets if necessary. For example, resetting the primary controller can return the primary controller or power supply unit to a "normal" (or non-bootloader) operating mode.

Figure 4:
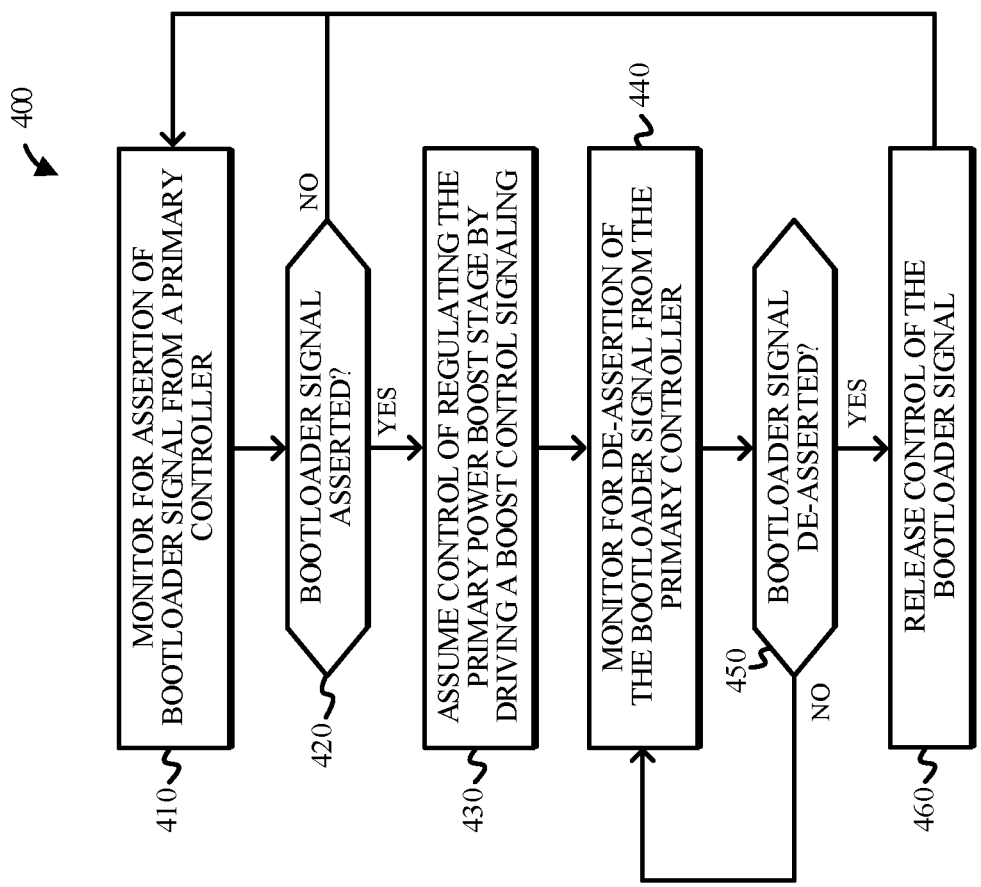
FIG. 4 depicts a flow diagram illustrating an example process for operating an auxiliary boost controller to assume control of regulation of a primary power boost stage, according to some implementations.

FIG. 4 depicts a flow diagram illustrating an example process 400 for operating an auxiliary boost controller to assume control of regulation of a primary power boost stage, according to some implementations. The example process 400 may be performed in various implementations by an auxiliary boost controller such as, for example, the auxiliary boost controller 118 of FIG. 1, or one or more processors, modules, engines, or components associated therewith.

To begin, at 410, the auxiliary boost controller monitors for assertion of a bootloader signal from a primary controller. At decision 420, the auxiliary boost controller determines if a bootloader signal has been asserted. If a bootloader signal is not received, then the process continues monitoring for assertion of the bootloader signal at 410. If a bootloader signal is received, at 430, the auxiliary boost controller assumes control of regulating a primary power boost stage by, for example, driving the boost regulator signal to regulate the step up of the output of the filter to a minimum threshold voltage.

At 440, the auxiliary boost controller monitors for de-assertion of the bootloader signal from the primary controller. At decision 450, the auxiliary boost controller determines if the bootloader signal is de-asserted. If the bootloader signal is de-asserted, at 460, the auxiliary boost controller releases control of the bootloader signal. As discussed herein, the primary controller can then re-assume control of the bootloader signal. Although not shown, in some implementations, the process then returns to monitoring for assertion of the bootloader signal from the primary controller at 410. If the bootloader signal is not de-asserted at decision 450, the process returns to monitoring for de-assertion of the bootloader signal at 440.

Figure 5:
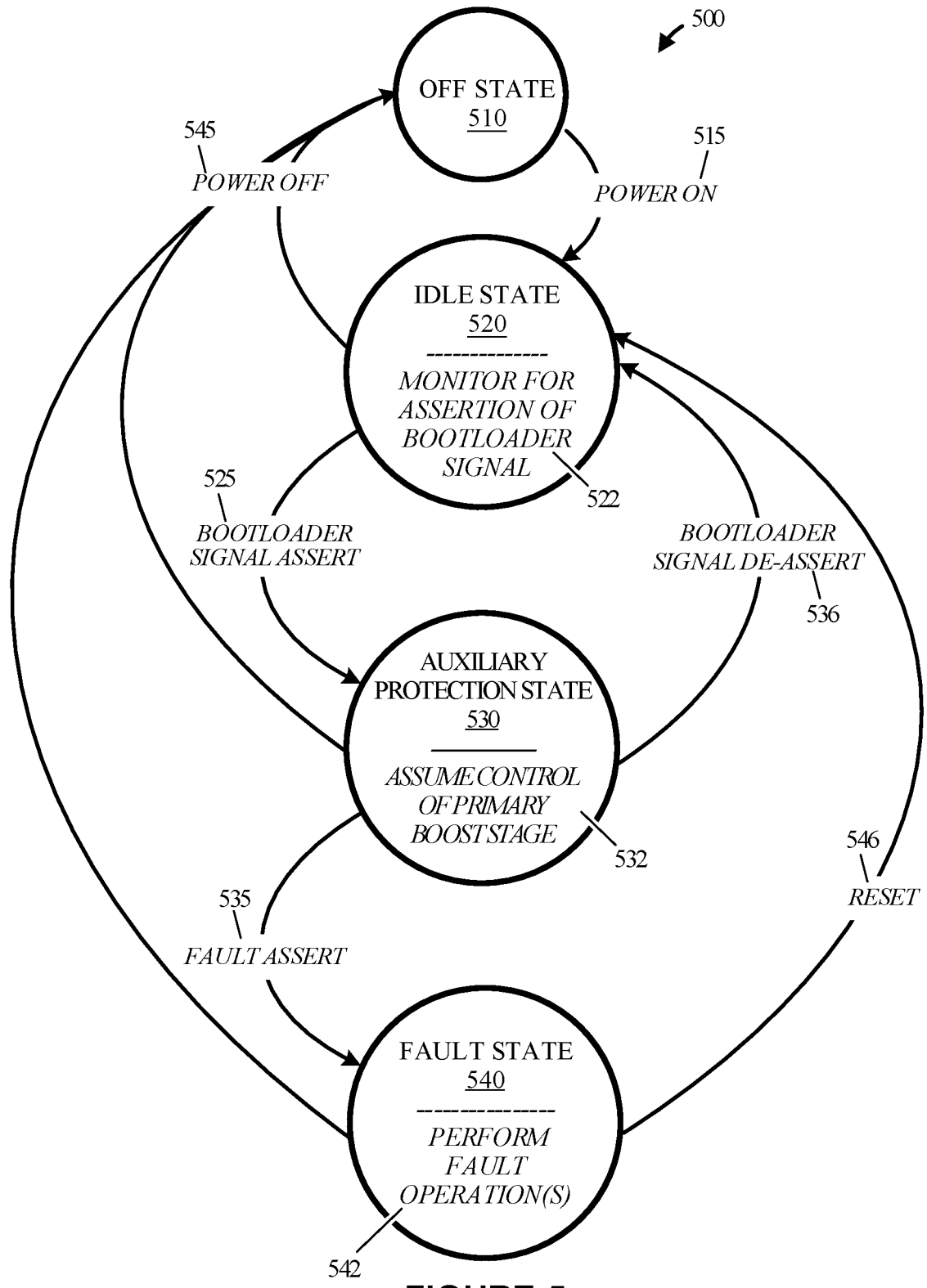
FIG. 5 depicts a state diagram illustrating example operations of an auxiliary boost controller, according to some embodiments.

FIG. 5 depicts a state diagram 500 illustrating example operations of an auxiliary boost controller, according to some embodiments. As shown in the example of FIG. 5, the state diagram 500 includes states 510, 520, 530 and 540, entry actions 522, 532 and 542, and transition conditions 515, 525, 535, 545, 536, and 546. The example state operations and transitions shown in state diagram 500 may be performed in various embodiments by an auxiliary boost controller such as, for example, the auxiliary boost controller 118 of FIG. 1, or one or more processors, modules, engines, or components associated therewith. Additional or fewer states, entry actions and transition conditions are possible.

The auxiliary boost controller is initially in an off state 510. As discussed herein, during the off state 510, all components of the power supply unit (including the auxiliary boost controller) are disabled. Powering on the power supply unit acts as transition condition 515 transitioning the auxiliary boost controller from the off state 510 to an idle state 520. Upon entering the idle state 520, entry action 522 is performed by the auxiliary boost controller. As shown in the example of FIG. 5, entry action 522 includes monitoring for assertion of a bootloader signal. As discussed herein, the power supply unit 100 is said to be in the bootloader mode when the primary controller 116 is performing bootloader operations. A bootloader is a piece of code which allows user application code to be updated through a communication interface such as, for example, I2C, UART, etc.

While operating in the idle state 520, detecting an indication that the bootloader signal is asserted acts as transition condition 525 transitioning the auxiliary boost controller from the idle state 520 to an auxiliary protection state 530. As discussed herein, primary controller asserts a bootloader signal to indicate that the primary controller is in the bootloader mode. Upon entering the auxiliary protection state 530, entry action 532 is performed by the auxiliary boost controller. As shown in the example of FIG. 5, entry action 532 includes assuming control of the primary power boost stage. Although not shown, entry action 532 also includes monitoring for occurrence of a fault.

In the auxiliary protection state 530, detecting the occurrence of a fault acts as transition condition 535 transitioning the auxiliary boost controller from the auxiliary protection state 530 to a fault state 540. Upon entering the fault state 540, entry action 542 is performed by the auxiliary boost controller. As shown in the example of FIG. 5, entry action 542 includes performing one or more fault operations.

During the fault state 540, detecting the occurrence of a reset acts as transition condition 546 transitioning the auxiliary boost controller from the fault state 540 back to the idle state 520. Furthermore, the occurrence of a power off event acts as transition condition 545 transitioning the auxiliary boost controller from any state to the off state 510.

Figure 6:
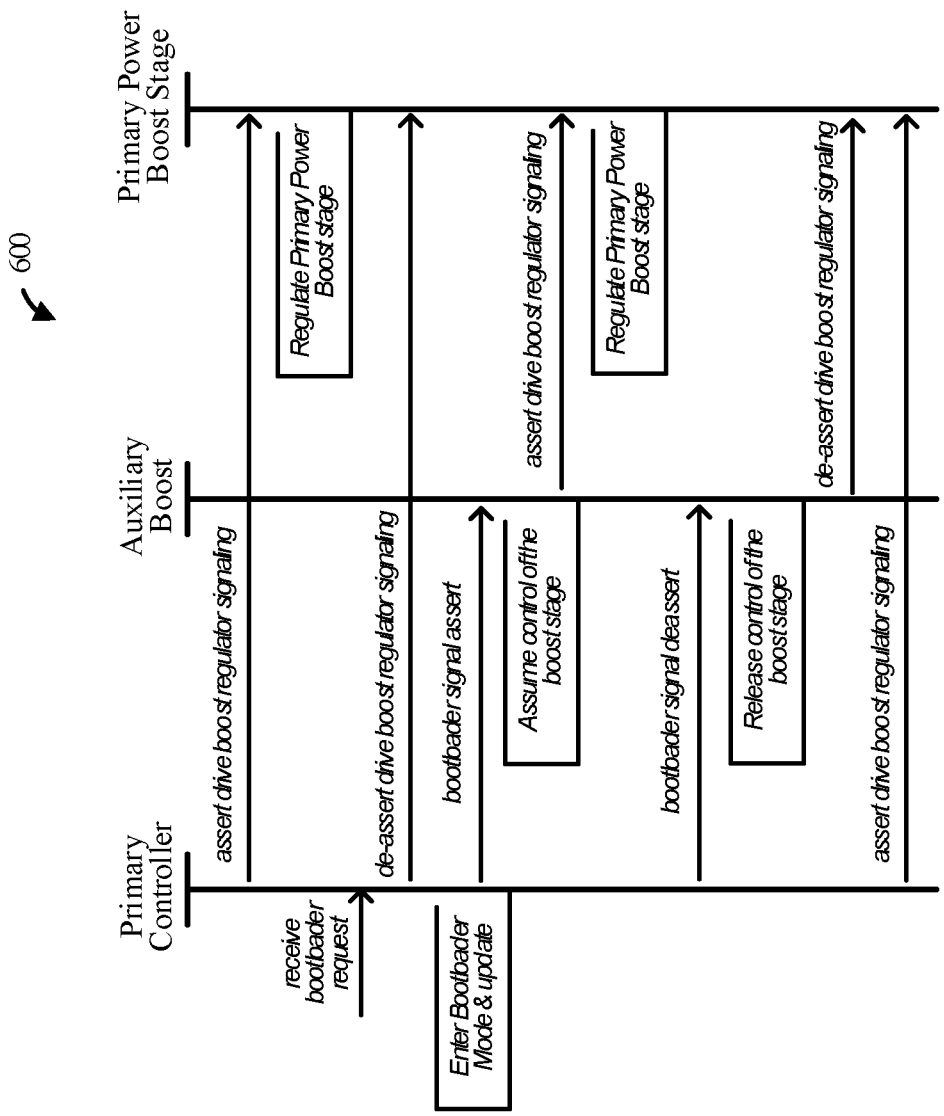
FIG. 6 depicts a signaling diagram illustrating example signaling occurring between various components of a power supply unit during a transition from "normal" (or non-bootloader) operating mode to a bootloader mode and back again, according to some implementations.

FIG. 6 depicts a signaling diagram 600 illustrating example signaling occurring between various components of a power supply unit during a transition from "normal" (or non-bootloader) operating mode to a bootloader mode and back again, according to some implementations. The primary controller, the auxiliary boost, and the primary power boost stage can be the primary controller 116, the auxiliary boost 118, and the primary power boost stage 114 of FIG. 1, although alternative configurations are possible.

Initially, the primary controller asserts drive boost regulator signaling to control the regulation of the primary power boost state. When a bootloader request is received, the primary controller de-asserts the drive boost regulator signaling and asserts the bootloader signal. The bootloader signal is received by the auxiliary boost control which, in turn, assumes control of the boost stage until the bootloader signal is de-asserted. When the bootloader signal is de-asserted, the auxiliary boost released control of the boost stage by de-asserting the drive boost regulator signaling. The primary controller then resumes control of the boost stage by re-asserting the drive boost regulator signaling.

Figure 7:
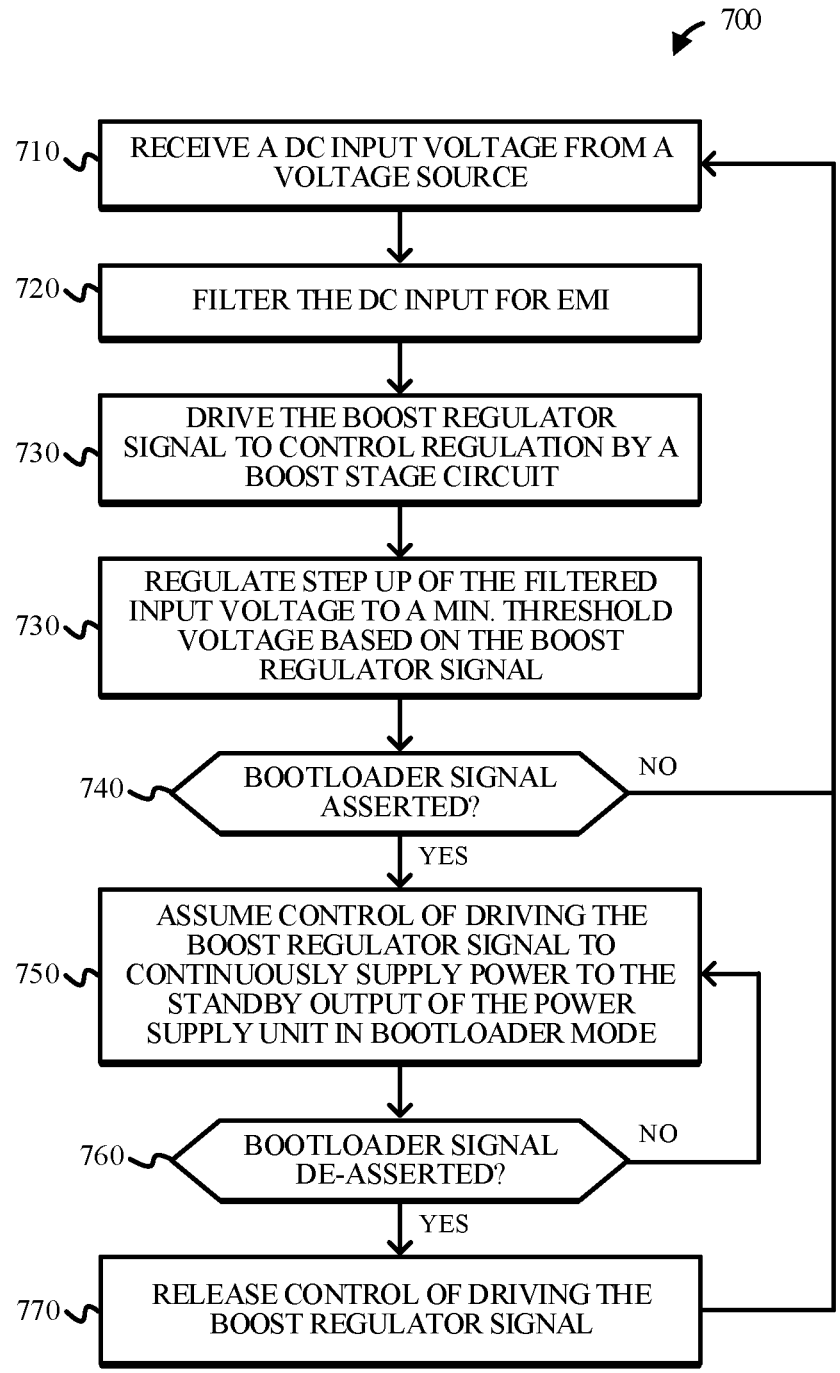
FIG. 7 depicts a flow diagram illustrating an example process for continuously supplying power to a standby output of a power supply unit in a bootloader mode, according to some implementations.

FIG. 7 depicts a flow diagram illustrating an example process 700 for continuously supplying power to a standby output of a power supply unit in a bootloader mode, according to some implementations. The example process 700 may be performed in various implementations by a power supply unit such as, for example, the power supply unit 100 of FIG. 1, or one or more processors, modules, engines, or components associated therewith.

To begin, at 710, the power supply unit receives a DC input voltage from a voltage source. At 720, the power supply unit filters the DC input for the EMI. At 730, the power supply unit drives the boost regulator signal to control regulation by a boost stage circuit. At decision 740, the power supply unit determines if a bootloader signal is asserted. If not, the process returns to step 710. Otherwise, at 750, the power supply unit assumes control of driving the boost regulator signal to continuously supply power to the standby output of the power supply unit in bootloader mode. At decision 760, the power supply unit determines if the bootloader signal is de-asserted. If not, the process returns to step 710. Otherwise, at 770, the power supply unit releases control of driving the boost regulator signal.

Figure 8:
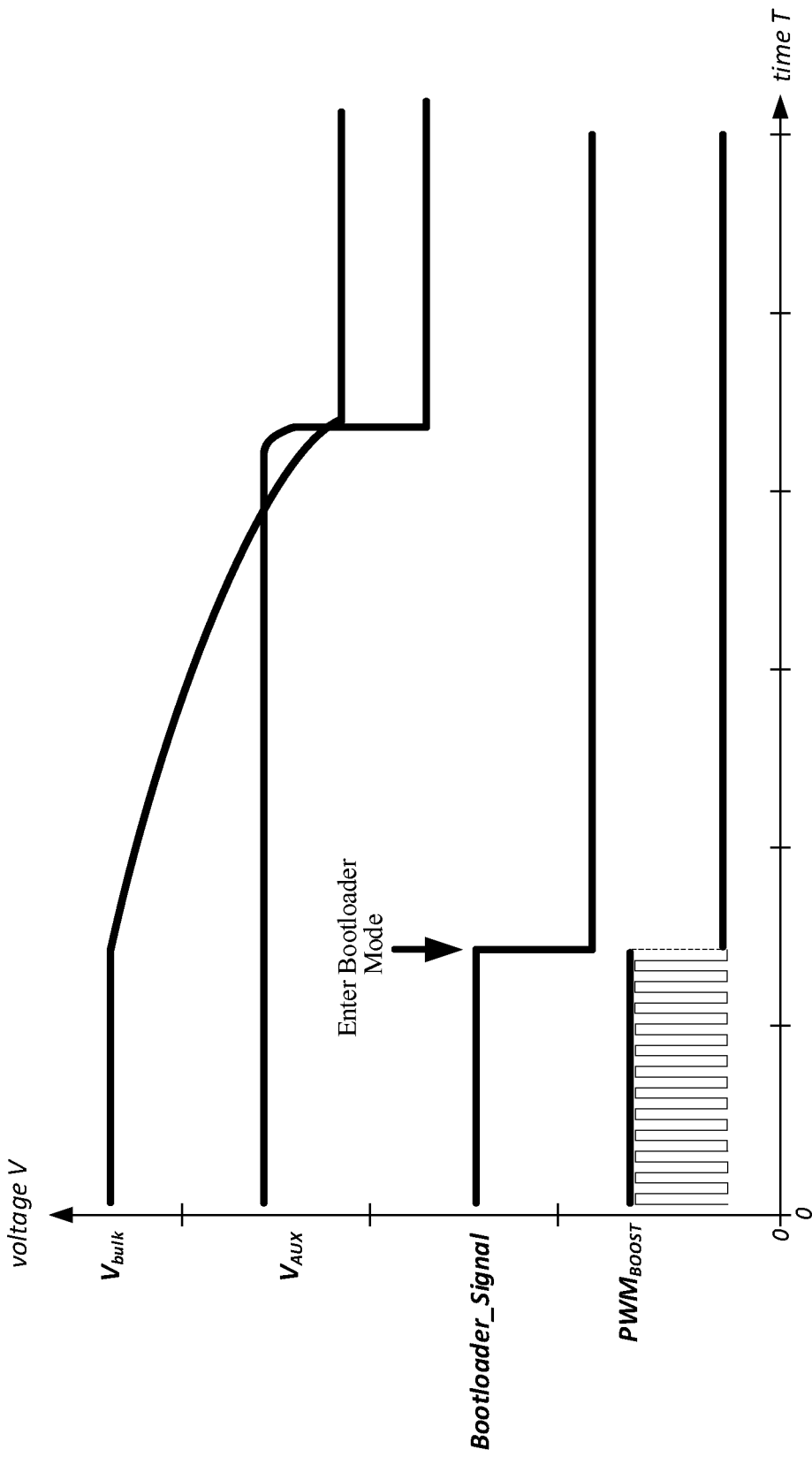
FIG. 8 depicts example waveforms illustrating intermediate voltage measurements of a power supply unit entering a bootloader mode without auxiliary boost control, according to some implementations.

FIG. 8 depicts example waveforms 800 illustrating intermediate voltage measurements of a power supply unit entering a bootloader mode without auxiliary boost control, according to some implementations. More specifically, as shown in the example of FIG. 8, if the power supply unit does not have an auxiliary boost control then the bootloader procedure can fail as the output of the primary power boost stage ($V_{bulk}$) and the standby output ($V_{AUX}$) are out of regulation.

Figure 9A:
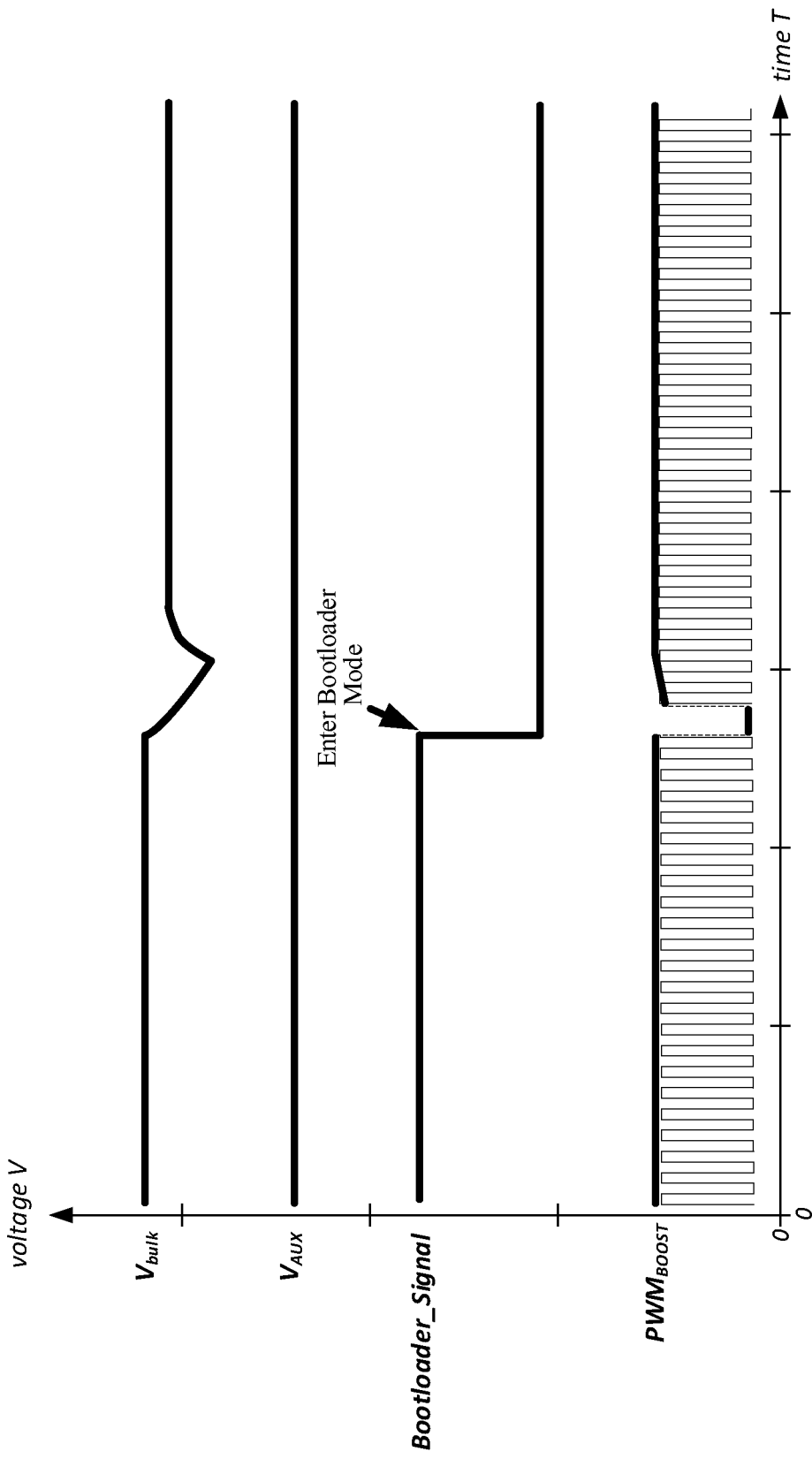
FIGS. 9A and 9B depict example waveforms and illustrating intermediate voltage measurements of a power supply unit entering and exiting bootloader mode with auxiliary boost control, according to some implementations.
Figure 9B:
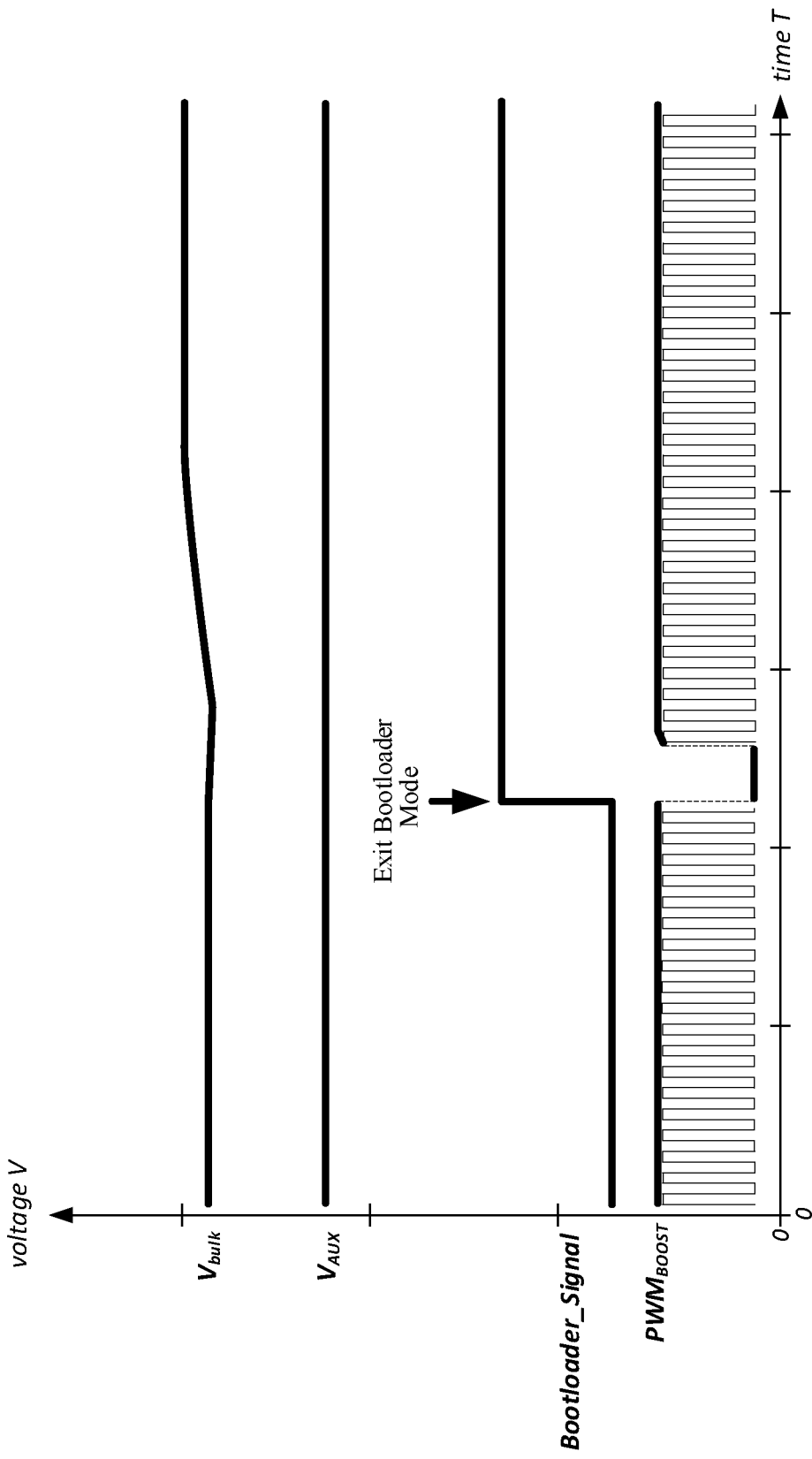

FIGS. 9A and 9B depict example waveforms 900A and 900B illustrating intermediate voltage measurements of a power supply unit entering and exiting bootloader mode with auxiliary boost control, according to some implementations. More specifically, the auxiliary boost control can be provided by an auxiliary boost controller such as, for example, auxiliary boost controller 118 of FIG. 1. As shown in the examples of FIGS. 9A and 9B, the standby output ($V_{AUX}$) is well-regulated entering and exiting the bootloader mode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A power supply unit, comprising:
an input configured to receive a direct current (DC) input voltage from a voltage source;
a filter coupled to the input and configured to reduce electromagnetic interference (EMI) in the input voltage;
a boost stage circuit coupled with the filter and configured to regulate step up of an output of the filter to a minimum threshold voltage based on a boost regulator signal;
a primary controller coupled with the boost stage circuit and configured to control the boost regulator signal;
a boost auxiliary circuit coupled with the primary controller and configured to assume control of the boost regulator signal during a bootloader mode;
a buck stage circuit coupled with the boost stage circuit and configured to regulate step down of an output voltage of the boost stage circuit to a predetermined DC output voltage based on a buck regulator signal;
a secondary controller coupled with the buck stage circuit and configured to control the buck regulator signal;
a bias module coupled with the boost stage circuit and configured to regulate the output voltage of the boost stage circuit to a nominal DC output voltage;
a main output configured to supply the predetermined DC output voltage to a load; and
a standby output configured to supply the nominal DC output voltage to the load.

2. The power supply unit of claim 1, wherein the boost stage circuit comprises a boost stage configured to pass the output of the filter when the output of the filter is greater than the minimum threshold voltage and increase the output of the filter to the minimum threshold voltage when the output of the filter is less than the minimum threshold voltage.

3. The power supply unit of claim 1, wherein the boost auxiliary circuit is further configured to maintain an idle state when the power supply unit is not in the bootloader mode and enter the bootloader mode in response to receiving a bootloader signal initiated by the primary controller.

4. The power supply unit of claim 3, wherein the boost auxiliary circuit is configured to assume control of the boost regulator signal during the bootloader mode by driving the boost regulator signal to regulate the step up of the output of the filter to the minimum threshold voltage.

5. The power supply unit of claim 4, wherein the bias module is further configured to continuously regulate the output voltage of the boost stage circuit to the nominal DC output voltage during the bootloader mode.

6. The power supply unit of claim 4, wherein the primary controller is further configured to assert the bootloader signal in response to receiving a request to enter the bootloader mode.

7. The power supply unit of claim 6, wherein the primary controller is further configured to perform a firmware update in response to the request and de-assert the bootloader signal upon completion of the firmware update.

8. The power supply unit of claim 1, wherein the boost auxiliary circuit is further configured to monitor for occurrence of a fault during the bootloader mode.

9. The power supply unit of claim 1, wherein the boost auxiliary circuit comprises a microcontroller or analog circuitry.

10. The power supply unit of claim 1, wherein the boost stage circuit comprises a switching regulator circuit.

11. A method of continuously supplying power to a standby output of a power supply unit in a bootloader mode, the method comprising:
receiving, by an input port of the power supply unit, a direct current (DC) input voltage from a voltage source;
filtering, by an electromagnetic interference (EMI) filter, the DC input voltage;
driving, by a primary controller of the power supply unit, a boost regulator signal to control regulation by a boost stage circuit;
regulating, by the boost stage circuit, step up of the filtered input voltage to a minimum threshold voltage based on the boost regulator signal;
asserting, by the primary controller, a bootloader signal in response to receiving a request to enter the bootloader mode; and
responsive to detecting assertion of the bootloader signal, assuming, by a boost auxiliary circuit coupled with the primary controller, control of driving the boost regulator signal to continuously supply the power to the standby output of the power supply unit in the bootloader mode.

12. The method of claim 11, further comprising:
prior to assuming control of the driving of the boost regulator signal, monitoring, by the boost auxiliary circuit, for the assertion of bootloader signal.

13. The method of claim 11, further comprising:
responsive to assuming control of the driving of the boost regulator signal, monitoring, by the boost auxiliary circuit, for de-assertion of the bootloader signal.

14. The method of claim 13, further comprising:
responsive to detecting de-assertion of the bootloader signal, releasing, by the boost auxiliary circuit, control of driving the boost regulator signal; and
responsive to releasing control of the boost regulator signal, resuming, by the primary controller of the power supply, control of driving the boost regulator signal to maintain regulation by the boost stage circuit.

15. The method of claim 13, wherein the boost stage circuit comprises a switching regulator circuit.

16. The method of claim 13, wherein the boost stage circuit comprises a boost stage configured to pass an output of the EMI filter when the output of the EMI filter is greater than the minimum threshold voltage and increase the output of the EMI filter to the minimum threshold voltage when the output of the EMI filter is less than the minimum threshold voltage.

17. An auxiliary boost control circuit for a low voltage direct current (LVDC) input power supply unit, the auxiliary boost control circuit comprising:
  means for monitoring for assertion of a bootloader signal in an idle state, wherein the bootloader signal indicates that a primary controller of the LVDC input power supply unit is entering a bootloader mode; and
  means for transitioning the auxiliary boost control circuit from the idle state to an auxiliary protection state responsive to assertion of the bootloader signal, wherein the auxiliary boost control circuit is configured to assume control of a boost regulator signal for controlling regulation of a boost stage circuit for stepping up an input to a minimum threshold voltage.

18. The auxiliary boost control circuit of claim 17, further comprising:
  means for monitoring for de-assertion of the bootloader signal in the auxiliary protection state; and
  means for transitioning the auxiliary boost control circuit from the auxiliary protection state back to the idle state responsive to the de-assertion of the bootloader signal.

19. The auxiliary boost control circuit of claim 17, further comprising:
  means for monitoring for a fault condition in the auxiliary protection state; and
  means for transitioning the auxiliary boost control circuit from the auxiliary protection state to a fault state responsive to the fault condition.

20. The auxiliary boost control circuit of claim 19, wherein the fault condition comprises one or more of an overcurrent protection fault or an overvoltage protection fault.

* * * * *